UNITED STATES PATENT OFFICE.

KONRAD KATHER, OF SAN FRANCISCO, CALIFORNIA.

COMPOSITION OF MATTER.

1,061,546.  Specification of Letters Patent.  Patented May 13, 1913.

No Drawing.  Application filed July 10, 1912. Serial No. 708,641.

*To all whom it may concern:*

Be it known that I, KONRAD KATHER, a citizen of the United States, residing at San Francisco, in the county of San Francisco and State of California, have invented a new and useful Composition of Matter to be used in Pneumatic Tires to Prevent Small Punctures from Leaking, of which the following is a specification.

My composition consists of the following ingredients, combined in the proportions stated, viz: water substantially pure 7 gallons, alcohol 2 gallons, rubber flakes (ground rubber) 20 pounds, sugar 40 pounds, glue 10 pounds, flour or ground asbestos, or both, 3 pounds, alum 1 pound. These ingredients are to be thoroughly mingled by agitation and thoroughly cooked and will vary some in amount through loss in cooking and handling.

The invention therefore comprises a sticky composition of the consistency of mucilage having suspended therein so as to be constantly movable solid particles of rubber, adapted to act as a seal in the event of a puncture. The rubber flakes, being of the same material as the tire, are admirably suitable for the filling of the holes therein, as the rubber itself is elastic and plugs the hole in the rubber tire satisfactorily. The sticky composition is constantly movable, and the alum and alcohol act to accelerate the formation of the non-porous body and tend to preserve the vitality of the inner tube rubber, by reason of the preservative qualities of the alcohol.

In obtaining the above named rubber flakes, I prefer to use blown out inner tubes of pneumatic automobile tires, which are ground by means of a rotating steel wire brush: which will reduce the rubber to a fine and spongy condition.

In using the above named composition, the small holes in pneumatic tires are instantly plugged up by the rubber flakes which are floating constantly in said composition, and which are pressed into said holes by the compressed air in the tire. I am aware that liquid fluid has been used for the same purpose, but I am not aware that rubber flakes of my composition have been used before.

I claim:

The herein-described composition of matter, consisting of water, alcohol, rubber flakes, sugar, glue, flour, asbestos, alum, substantially as described and for the purpose specified.

KONRAD KATHER.

Witnesses:
DAVID MILES DAWSON,
L. C. STICKEN.